Feb. 28, 1961 A. A. MILLER 2,972,909
AUTOMATIC CHANGE SPEED GEARS
Filed May 26, 1953 3 Sheets-Sheet 1

INVENTOR
ALBERT ARTHUR MILLER
BY
ATTORNEY

Feb. 28, 1961 A. A. MILLER 2,972,909
AUTOMATIC CHANGE SPEED GEARS
Filed May 26, 1953 3 Sheets-Sheet 2

INVENTOR
ALBERT ARTHUR MILLER
BY
ATTORNEY

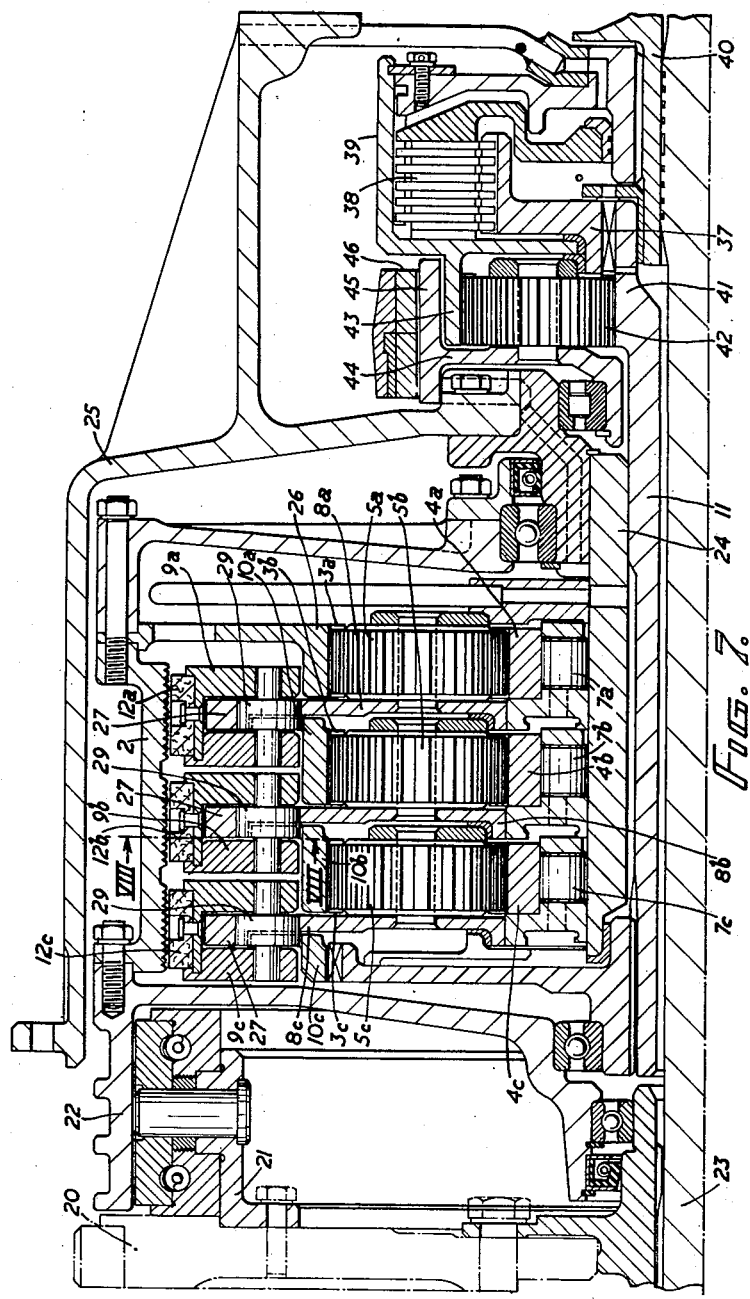

United States Patent Office 2,972,909
Patented Feb. 28, 1961

2,972,909
AUTOMATIC CHANGE SPEED GEARS

Albert Arthur Miller, Esher, England, assignor, by mesne assignments, to Self Changing Gears Limited, Coventry, England, a British company Filed May 26, 1953, Ser. No. 357,550

Claims priority, application Great Britain May 28, 1952

13 Claims. (Cl. 74—751)

This invention relates to automatic change speed gears, that is to say gears (usually employed in motor vehicles) in which the gear changes are made automatically as necessitated by the conditions.

The object of the invention is the provision of improvements on such automatic change speed gears. The invention consists broadly of an automatic change speed gear, comprising a clutch-and-link device which acts as a rotating link in a relatively low speed transmission train, and which also constitutes one element of a clutch which, when engaged with a complementary element, completes a relatively high speed transmission train, the arrangement being such that the torque transmitted by said device, acting as a link in the relatively low speed transmission train, urges said device out of engagement with said complementary clutch element, so that falling torque tends to permit the change from the relatively low speed to the relatively high speed transmission train, and the torque transmitted by said device, acting as a clutch element in engagement with said complementary clutch element, in said relatively high speed transmission train, tends to cause said clutch to slip, so that rising torque tends to effect the change from the relatively high speed to the relatively low speed transmission train.

In order that the invention may be the more clearly understood, a number of embodiments will now be described, reference being made to the accompanying drawings wherein:

Figure 7 is a half sectional elevation illustrating the construction of Figure 6 in more detail;

Figure 1:
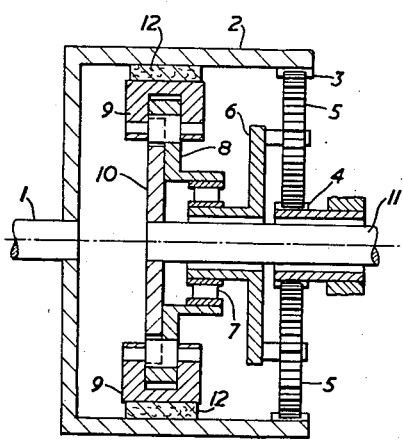
Figures 1 to 5 are diagrammatic sectional side elevations of five different respective two speed gear constructions in accordance with the invention.

Referring first to Figure 1, the input to the unit is to a shaft 1 rigidly connected to a rotatable drum 2 whose inner periphery carries rigidly an internally toothed gear 3. Coaxially within said drum is a stationary sun gear 4, and, in mesh with both said sun gear and said internally toothed gear 3, are say three or more planet gears 5 at equal angular intervals around the axis of said drum. These planet gars 5 are mounted on a rotatable planet carrier 6, which is coupled, through the medium of a free wheel device 7, an input plate 8, a set of friction shoes 9, and an output plate 10 to the output shaft 11. The precise correlation of the input plate 8, the friction shoes 9 and the output plate 10 will be described later. For the moment it is sufficient to say that the friction shoes 9 are biased outwardly to the position at which their friction linings 12 engage the inner periphery of the drum 2, and, in response to torque being developed, through said friction shoes, between said input plate 8 and said output plate 10, said friction shoes are urged inwardly, in opposition to their bias, and out of engagement with said drum. Said free wheel device 7 is arranged to permit said input plate 8 to overrun the planet carrier 6 but not to permit said planet carrier to overrun said input plate. It will be seen that, when the two clutch elements, i.e. the friction shoes 9 and the drum 2, are out of engagement the unit transmits with a step-down speed ratio, the drum 2 causing the planet gears 5 to roll round the stationary sun gar 4 and thereby rotate the planet carrier 6 at a speed less than that of the drum, and the planet carrier rotating the output plate 10 and output shaft 11 at the same speed as itself through the said free wheel device 7, said input plate 8 and the friction shoes 9. If, however, the drum 2 and the friction shoes are in clutching engagement, a direct drive will be obtained from the drum 2 to the friction shoes and from said connecting link to the output plate 10 and output shaft 11. The planet carrier 6 will continue to rotate at a speed less than that of the drum 2, that is to say less than that of the friction shoes 9, this being permitted by the free wheel device 7.

The engagement and disengagement of the clutch elements (drum 2 and friction shoes 9) is controlled according to both speed and torque. That is to say the disengagement is effected when the torque is above a given value which is greater or less according as the speed is greater or less, and the engagement is effected when the torque is below a given value which is greater or less according as the speed is greater or less.

Thus when the unit is at rest and no torque is applied to the drum 2, the friction shoes 9 will be maintained under their bias in clutching engagement with said drum, and the unit will be in condtiion for direct drive. When now torque is applied to the drum 2, assuming that the load on the output shaft 11 is appreciable, say by the vehicle in which the unit is employed being on level ground and heavily laden, the torque, before the output shaft 11 begins to rotate, will rise to a value, depending on the strength of the outward spring bias on the friction shoes 9, at which the drum 2 will overrun said friction shoes by slippage. When this happens, torque will be transmitted from the drum 2 to the output shaft 11 by the speed reduction path, i.e. from the drum to the planet carrier 6, and thence through the friction shoes 9 to said output shaft 11. This torque will pull said friction shoes 9 inwards out of engagement with the drum 2, and the unit will be at the condition for speed reduction drive.

Assuming now that the unit is transmitting to the output shaft 11 under conditions of speed reduction, i.e. with the friction shoes 9 held out of engagement with the drum 2 by the torque on the planet carrier 6, said friction shoes will be rotating at the speed of said output shaft, and said friction shoes will be urged towards the drum-engaging position by centrifugal force depending on the speed of rotation of said output shaft. This force will augment the force exerted by the spring bias. When the torque falls or when the speed increases to a value such that the total engaging force exerted on the friction shoes 9, by centrifugal force and the spring bias, prevails over the disengaging force exerted by said torque, said friction shoes will engage with the drum 2 and the direct drive will be established. It will be seen that the higher is the speed, the higher will be the torque at which this change is effected. It will be seen that immediately the linings 12 of the friction shoes 9 touch the drum 2 there will be a reduction in the torque transmitted by way of the speed reduction path. This causes a reduction in the force tending to disengage the friction shoes 9, and thus the friction shoes rapidly acquire the full engaging force necessary for direct transmission of the torque so that there will be no sustained slippage and no force tending to disengage the friction shoes, as there will be no torque transmitted via the speed reduction path through the friction shoes acting as links.

Assuming now that the unit is driving the output element with a direct drive, there will be a drum-engaging force acting on the friction shoes 9 which is due to the force exerted by the spring bias and a centrifugal force depending, as before, on the speed of rotation of the output element 11. There will be no drum-disengaging force acting on the friction shoes. When the torque exceeds a given value, slippage will take place and the drum 2 will overrun the friction shoes 9. When the consequential and appropriate disparity of input and output speeds ensues, a certain amount of torque will be transmitted through the speed reducing path, i.e. through the planet carrier 6, the free wheel device 7, the input plate 8 and the friction shoes 9 acting as connecting links, and thus a drum-disengaging force will be developed acting on the friction shoes. This will increase the torque transmitted through the speed reducing path, which will again increase the disengaging force, and thus in a very short period the friction shoes 9 will be moved to the fully disengaged position and the condition for speed reduction with torque multiplication will obtain.

It will be seen that, if, in the above-described embodiment of Figure 1, the input is to the planet carrier 6 instead of to the drum 2, an arrangement will be produced in which, when the friction shoes 9 are disengaged from the drum, a direct drive will be obtained, and when said friction shoes are engaged with the drum a speed inceasing transmission will be obtained.

Figure 2:
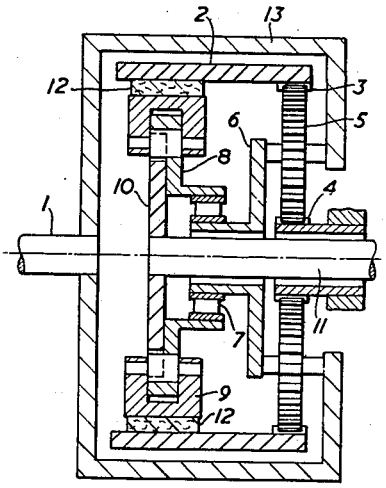

Such an arrangement is illustrated in Figure 2, in which the input shaft 1, instead of being secured to the drum 2, is secured to an outer drum 13 which is secured to the planet carrier 6 as clearly shown. In this arrangement, when the friction shoes 9 are disengaged from the drum 2, the drive will be from the planet carrier 6, through the free wheel device 7, the input plate 8, the friction shoes acting as connecting links, and the output plate 10, to the output shaft 11. The drum 2 will be rotating at a speed greater than the planet carrier 6 but will be idling. When the friction shoes 9 are engaged with the drum 2, the drive will be from the planet carrier 6 to the drum 2, which rotates at a higher speed than said planet carrier, and from said drum through the friction shoes 9 and the output plate 10 direct to the output shaft 11, the drum 2 and friction shoes 9 being permitted to overrun the planet carrier 6 by virtue of the free wheel device 7.

It will readily be seen that the clutching and declutching function is the same as before. That is to say, when the lower speed transmission (i.e. direct drive) is in operation, with the friction shoes 9 disengaged from the drum 2, said friction shoes will engage said drum, producing the change to the higher speed transmission, when the torque is below a given value which is greater or less according to the speed is greater or less, and when the higher speed transmission is in operation, the friction shoes will slip and then disengage the drum, thereby producing the lower speed transmission, when the torque is above a given value which is greater or less according as the speed is greater or less. The same conditions of instability during each change of speed ratio, ensuring progression of change will also obtain, and also the same differences in the torque values required at a given speed for a change up and a change down.

Figure 3:
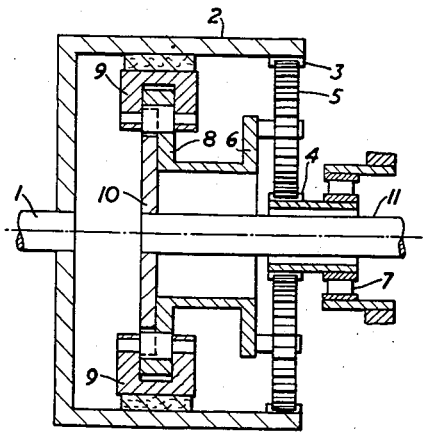

Referring now to Figure 3, the construction and arrangement is the same as that of the embodiment of Figure 1 except that the free wheel device 7, instead of being connected between the planet carrier and the input plate 8, is connected between the sun gear 4 and the fixed arbour on which said sun gear is mounted, so that said sun gear can rotate forwards but not backwards. The planet carrier 6 is connected direct to the input plate 8.

It will be seen that, as in the case of Figure 1, when the friction shoes 9 are in engagement with the drum 2, there is a direct drive from the drum 2 through the friction shoes 9, to the output plate 10 and the output shaft 11, and, when the friction shoes 9 are out of engagement with the drum 2, there is a speed reduction drive from the drum through the planet carrier 6, the input plate 8 and the friction shoes 9 acting as a link, to the output plate 10 and output shaft 11. The only difference is that, whereas in Figure 1, during direct drive, the planet carrier 6 idles round at reduced speed, with the drum 2 and friction shoes 9 overrunning said planet carrier owing to the free wheel device 7, in the present arrangement said planet carrier 6 idles round en bloc with the drum 2 and friction shoes 9 and the sun gear 4 also rotates en bloc with the planet carrier, this being permitted by the free wheel device 7. The whole function is otherwise unchanged.

Figure 4:
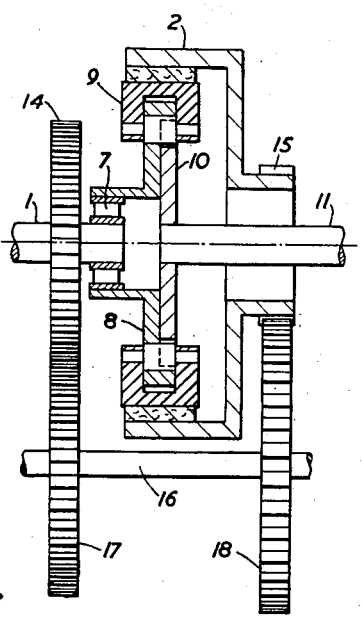

In accordance with the arrangement illustrated in Figure 4, the epicyclic principle is abandoned and a lay-shaft arrangement is adopted instead. In this embodiment, the input shaft 1 has an input gear 14 fast on it and the output shaft 11 (coaxial with said input shaft) has a (say) smaller gear 15 running loose on it. A lay shaft 16 is provided parallel to the input and output shafts 1 and 11, which has fast on it gears 17 and 18 in mesh respectively with said input gear 14 and said loosely running gear 15. Thus whenever said input shaft 1 is rotated said loosely running gear 15 is rotated at a higher speed. The drum 2 is fast with the loosely running gear 15. The input shaft 1 is also connected fast to the driving element of a free wheel device 7 whose driven element is fast with the input plate 8. The output plate 10 is fast, as before, with the output shaft 11.

It will now be seen that, if the friction shoes 9 are disengaged from the drum 2, a direct drive is obtained from the input shaft 1 to the output shaft 11 through the free wheel device 7, the input plate 8 and the friction shoes 9 acting as links to the output plate 10 and said output plate 11. If the friction shoes 9 are engaged with the drum 2, a drive at an increasing speed ratio will be effected from the input gear 14 through the gears 17, 18 on the lay shaft 16 to the loosely running gear 15, and thence to the drum 2 and friction shoes 9 to the output plate 10 and output shaft 11. In this case the drum 2 and friction shoes 9 will be permitted to overrun the input shaft 1 by virtue of the free wheel device 7.

It will be readily understood that, as in the previously described arrangements, when the lower speed transmission is in operation with the friction shoes 9 disengaged from the drum 2, said friction shoes will engage said drum, producing the change to the higher speed, when the torque is below a given value which is greater or less according as the speed is greater or less, and when the higher speed transmission is in operation, the friction shoes will disengage the drum, thereby producing the lower speed transmission, when the torque is above a given value which is greater or less according as the speed is greater or less. The same conditions of instability during change of speed ratios, ensuring progression of change will also obtain, and also the same differences in torque values required at a given speed for a change up and a change down.

It will be clear that, in this embodiment, if the input was applied to the gear 15 and the output to the shaft 11 as before, if the friction shoes 9 disengaged from the drum 2, a step-down transmission is obtained, by way of gear 8, gear 17, gear 14, the free wheel device 7, the friction shoes 9 acting as links and the output plate 10. If the friction shoes 9 are engaged with the drum 2, a direct en bloc drive will be obtained, by way of the drum 2, the friction shoes 9 and said output plate 10. In this case, as the friction shoes will be rotating more rapidly than the gear 14, the free wheel device 7 will over run.

It is obvious that the change up and the change down will be determined by torque and speed in like manner as before.

Figure 5:
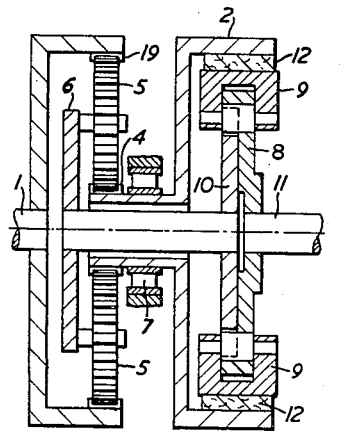

In accordance with the arrangement illustrated in Figure 5, the input shaft is fast with an internally toothed gear 19 which rotates round a sun gear 4 which is controlled by a free wheel device 7 so as to be capable of rotating forwards but not backwards. Planet gears 5 mounted on a planet carrier 6 are in mesh with both said internally toothed gear 19 and said sun gar 4. A drum 2 similar to that of the preceding embodiments is fast with said sun gear 4, and the plate 8 and plate 10, between which the friction shoes 9 are coupled as links as before, are coupled respectively to the output shaft 11 and the planet carrier 6. It will thus be seen that the plate 8 now becomes the output plate and the plate 10 the input plate.

It will be seen that, when the friction shoes 9 are disengaged from the drum 2, a drive at reduced speed will be obtained from the internally toothed gear 19 to the planet carrier 6 and direct from said planet carrier to the plate 10, the friction shoes 9 acting as links, and the plate 8 to the output shaft 11. When the friction shoes 9 are engaged with the drum 2, the planet carrier 6 and the output shaft 11 will both rotate with the drum 2, so that a direct drive will be obtained, the internally toothed gear 19, the planet carrier 6, the sun gear 4, the drum 2 and the output shaft 11 all rotating as one piece, this being permitted by the free wheel device 7.

As in the previously described arrangements, there is, at all times, a force, which varies with the speed of the output shaft 11, tending to engage the friction shoes 9 with the drum 2, and when the transmission is through the lower speed transmission path there is a force, proportional to the torque exerted through said path on the output shaft 11, tending to hold said friction shoes 9 at the disengaged position. Thus the function is substantially the same as in said preceding arrangements.

Figure 6:
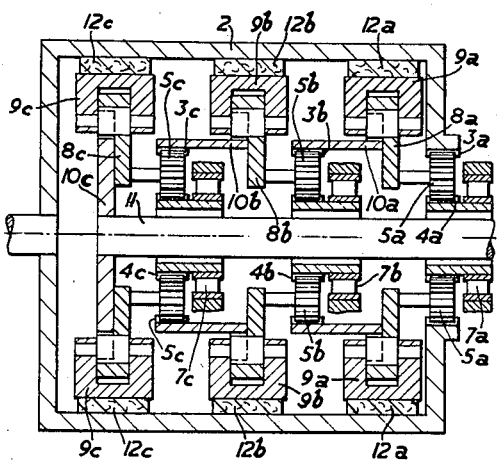
Figure 6 is a similar view illustrating a four speed gear construction operating on the same lines as the two speed construction of Figure 3.

In all the above described embodiments, a number of the units may, in practice be connected in series between say the engine and road wheels of a motor vehicle, the units being adapted to respond in sequence to give progressive increases and decreases of transmission ratio according to variations of speed and torque on the driving wheels. In the case of the embodiment of Figure 3, the series connection of the units may be effected as illustrated in Figure 6.

Assuming that there are three units, a common drum 2 is employed for all three units. In the case of the first unit the internal teeth 3a are fast with said drum 2 as heretofore described, but in the case of the other two units the internal teeth 3b and 3c are respectively fast on the output plates 10a and 10b of the preceding units. The output plate 10c of the third unit is fast with the output shaft 11 of the whole assembly.

In all other respects the three units are identical. The component parts of the units have been designated by the same references as in Figure 3, except that the suffix a has been added to the component parts of the first unit, the suffix b to the component parts of the second unit, and the suffix c to the component parts of the third unit; and except also that, in this design, the planet carriers are each one and the same part with the input of the same unit so no separate planet carriers are shown but only the input plates 8a, 8b and 8c.

Assuming that all three units are operating at the lower speed ratio, with the friction shoes disengaged from the common drum, the transmission train may be traced from the common drum 2, and the internal teeth 3a of the first unit to the planet carrier or input plate 8a of the first unit, thence through the friction shoes 9a of said first unit acting as links to the output plate 10a of said first unit and the internal teeth 3b of the second unit, thence to the planet carrier or input plate 8b of said second unit, and through the friction shoes 9b of the second unit acting as links, to the output plate 10b of said second unit and the internal teeth 3c of the third unit, thence to the planet carrier or input plate 8c of said third unit, and through the friction shoes 9c of said third unit acting as links, to the output plate 10c of said third unit and the output shaft 11.

It will be noted that under these conditions the torque transmitted by the friction shoes 9a of the first unit is less than that transmitted by the friction shoes 9b of the second unit which, in turn, is less than that transmitted by the friction shoes 9c of the third unit. Also the speed of rotation of the friction shoes 9a of the first unit is greater than that of the friction shoes 9b of the second unit, which, in turn is greater than that of the friction shoes 9c of the third unit. Therefore the disengaging force is least in the case of the friction shoes 9a of the first unit and greatest in the case of the friction shoes 9c of the third unit while the engaging force is greatest in the case of the friction shoes 9a of the first unit and least in the case of the friction shoes 9c of the third unit.

It follows that, when falling torque and/or rising speed calls for a higher speed ratio, the friction shoes 9a of the first unit will be the first to engage the common drum 2. When they do so the drive will pass direct from said common drum to the internal teeth 3b of the second unit and the parts of the first unit will rotate as a block, with the common drum. The speed ratio transmitted by the whole assembly will therefore increase.

In like manner, when further falling torque and/or rising speed calls for a still higher speed ratio, the friction shoes 9b of the second unit will be the next to engage the common drum 2, and when they do so the drive will pass direct from said common drum to the internal teeth 3c of the third unit, and the parts of second unit as well as the first will all rotate as a block with the common drum. The speed ratio transmitted by the whole assembly will increase further. When further falling torque and/or rising speed calls for still higher speed ratio, the friction shoes 9c of the third unit will engage the common drum 2, and the drive will pass direct from said common drum to the output shaft 11 via the output plate 10c of the third unit, the parts of all three units rotating as a block with the common drum.

It will be seen that, when this direct drive is in operation, no torque at all exists between the common drum 2 and the friction shoes 9b and 9a of the second and first units, but only between said common drum and the friction shoes 9c of the third unit. Thus when rising torque and/or falling speed calls for a reduction in the speed ratio, the friction shoes 9c of the third unit will be the first to slip relative to the common drum 2, whereupon said third unit will return rapidly to the lower speed ratio state. Torque will now exist between the common drum 2 and the friction shoes 9b of the second unit so, when a further reduction of speed ratio is required the second unit will return to the lower speed ratio state. Last of all the first unit will return to the lower speed ratio state.

Describing now in some deail with reference to Figure 7 a practical construction of three units operating as above outlined, the engine fly wheel 20, which will be assumed at the left hand end of the common drum has one element 21 of a centrifugal clutch bolted to its right hand face, the other element 22 of said clutch being bolted to the left hand end of said common drum 2. The engine shaft 23 (fast with the fly wheel) extends to the right completely through said drum 2 and also through a reversing mechanism at the right hand end of said drum, which will be hereinafter described. At its right hand end said engine shaft drives a hydraulic pump (not shown).

The first unit is in the right hand end of the drum 2; the third unit is in the left hand end of the drum, and the second unit is between the first and the third. The output shaft 11 (connected to the output of the third unit) is hollow and surrounds the engine shaft 23. It extends rightwards beyond the right hand end of the drum 2 where it is coupled to the reversing mechanism, as will be described later.

A fixed tubular sleeve 24, which surrounds the output shaft 11, and whose right hand end, beyond the right hand end of the drum 2, is secured to the casing 25 of the mechanism, extends into the drum nearly to its left hand end. This sleeve constitutes the fixed arbour for the three units, the three sun gears, 4a, 4b and 4c being mounted on said sleeve through the free wheel devices 7a, 7b and 7c. These sun gears may be identical.

The internal teeth 3a for the first unit are formed on the inside of an annulus 26 which is fast with the drum 2 and at a radius between the internal periphery of the drum and the external periphery of the sun wheel 4a of the first unit. The internal teeth 3b and 3c of the other two units are formed on the inside of respective annuli which are of the same radius as that of the first unit and form part of the output plates 10a, 10b of the first and second units as clearly shown.

The friction shoes 9a of the first unit are in a plane between the gears 5a of said first unit and those 5b of the second unit. The friction shoes 9b of the second unit are likewise in a plane between the gears 5b of the second unit and those 5c of the third unit, and the friction shoes 9c of the third unit are in a plane just to the left of the gears 5c of said third unit.

The planet carrier or input plate 8a, 8b or 8c of each unit consists of a plate immediately to the left of the gears 5a, 5b or 5c of said unit. This has outwardly projecting portions 27 (Figure 8) at intervals round its edge, and two of said projecting portions 27 extend into a central recess of each friction shoe 9a, 9b or 9c of the unit. Each projecting portion has a slot 28 through it, through which passes a pin or roller 29 mounted on the shoe within said recess. It will be seen that the axes of said pins or rollers 29 are parallel to the axis of the drum 2.

Figure 8:
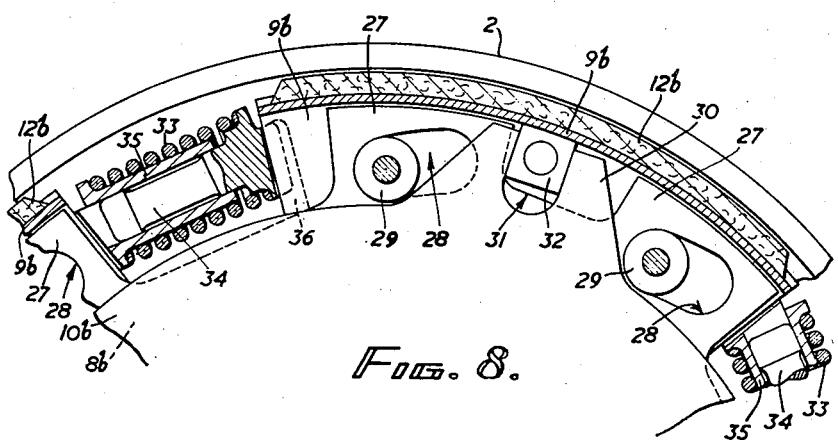
Figure 8 is a fragmentary section on line VIII—VIII of Figure 7.

The slot and pin connections 28, 29 between said planet carrier, say 8b, and said shoes, say 9b, permit of a lost motion rotary movement between said planet carrier and said shoes, and the slots 28 are so inclined that, when the planet carrier is at the forward limit of its movement relative to said shoes, as in Figure 8, said shoes are held inwardly against their bias out of engagement with the inner periphery of the drum 2, and, when said planet carrier is at the rearward limit of its movement relative to said shoes, said shoes are permitted to engage the inner periphery of the drum.

The output plate 10a, 10b or 10c of each unit is also formed with a number of radial projections 30 which extend into said recess in the shoes of that unit, one into each shoe. Each of these radial projections 30 has a radial slot 31 in it, in which a driving block 32 secured to the shoe, say 9b (Figure 8), slidably engages. It will thus be seen that the output plate of each unit is constrained to rotate with the shoes of that unit, the slot and driving block connections 31, 32 however permitting the shoes to move radially to their engaged and disengaged positions.

The pin-and-slot connections 29, 28 for each shoe are located near the forward and rear ends thereof as shown in Figure 8, so that each shoe is maintained level as it moves to its disengaged and engaged positions. The slot-and-driving-block connection 31, 32 for each shoe is located midway between the ends of the shoe.

It will now be seen that, when the friction shoes 9a, 9b or 9c of any unit are at their disengaged position, the planet carrier 8a, 8b or 8c of said unit will drive the internal teeth 3b or 3c of the succeeding unit, or, in the case of the third unit, the output shaft 11, through the pin and slot connections 29, 28, the shoes themselves and the driving-block-and-slot connections 31, 32. Also owing to the pin-and-slot connections 29, 28 the shoes will be held at their disengaged positions. When the friction shoes of any unit are at the engaged position the gears of that unit will be out of effective operation, and the drive will be direct from the drum 2 to the internal teeth 3b or 3c of the subsequent unit. Also there will be no inward pull tending to operate the shoes of that unit to the disengaged position.

As an alternative to the arrangement shown in Figure 8 the clutch shoes may be arranged as in Figure 2 of specification No. 679,493, the plates 9 and 14 of that specification replacing the plates 10 and 8 respectively of the present Figure 8.

It will be seen from the above constructional description that the function will be as heretofore described in connection with the embodiments of Figures 1 to 6. In the construction of Figures 7 and 8 there are four shoes to each unit and the outward biasing is effected by means of compression springs 33 (Figure 8) between the adjacent ends of the shoes. These springs 33 are mounted on telescopic guides having inner and outer elements 34 and 35, the ends of which are forked and engage recesses 36 in the end faces of the shoes.

Describing now the reversing mechanism, the output shaft 11 at its right hand end, beyond the drum 2 and the drum casing 25 is connected to the inner element 37 of a multiple disc clutch 38, hereinafter termed the forward clutch, having an outer element 39 or drum which is connected to a final output shaft 40 located beyond the right hand extremity of the aforesaid output shaft 11.

Between the forward clutch 38 and the right hand end of the drum casing 25, the output shaft 11 has a sun gear 41 integral with it. This is coupled through the planet wheels 42 to an internally toothed annulus 43 rigid with the outer element or drum 39 of the forward clutch 38, i.e. rigid with the final output shaft 40. The planet carrier 44 of the planet wheels carries a reverse-brake drum 45, and a reverse-brake band 46 is provided which can either brake this drum 45 or let it run free.

When the forward clutch 38 is engaged the reverse-brake band 46 is off and vice versa. With the forward the output shaft 11 through said clutch 38 to the final clutch engaged the drive will obviously be direct from output shaft 40, the sun wheel 41 and the annulus 43, together with the planet carrier 44 and the reverse-brake drum 45, rotating as one piece. With the forward clutch 38 disengaged, and the reverse-brake band 46 holding the reverse brake drum 45, and therefore the planet carrier 44, stationary, the drive is from the sun gear 41 through the planet gears 42 to the annulus 43, i.e. to the final output shaft 40, said final output shaft being driven in the reverse direction to the first output shaft 11.

Normally the mechanism is set for forward running with the forward clutch 38 engaged and the reverse-brake band 46 released. The forward clutch 38 and the reverse brake band 46 are under manual control say by hydraulic power derived from the pump operated by the engine shaft 23.

It will be appreciated that when the engine is started it will idle and will only commence to drive when its speed is raised a sufficient amount to bring the centrifugal clutch 21, 22 into the engaged state.

Other details are deemed sufficiently clear from the drawings.

In all the above embodiments the friction shoes are described as being biased by spring means into engagement with the drum. This spring means could, however, be dispensed with, leaving the friction shoes to be actuated to the engaged position solely by centrifugal force. Alternatively, power means such as hydraulic or electromagnetic means could be employed in place of the spring means. Alternatively it would be possible to have light spring means biasing the shoes to the disengaged position.

It will be appreciated that many further variations, modifications and developments are possible. For example, a direct drive manual clutch, preferably oil operated could be provided in addition to or instead of the centrifugal clutch 21, 22.

Again, as an alternative, or additionally, to the aforesaid forward multiple plate clutch 38 an epicyclic gear train could be provided giving a step-up or step-down coupling, the reaction member of the eicyclic gear being controlled by a brake giving transmission when the brake is on.

I claim:

1. An automatic change speed gear, comprising a driving member, a driven member, a relatively low speed transmission train between said driving member and said driven member, a relatively high speed transmission train between said driving member and said driven member, a clutch-and-link device separate connections connecting said clutch-and-link device between elements of said low speed transmission train, whereby said clutch-and-link device acts as a rotating link in said low speed transmission train, a complementary clutch element, said clutch-and-link device and said complementary clutch element forming the two elements of a clutch, and said clutch, when at the engaged state, completing said high speed transmission train, over-run means apertaining to the low speed transmission train enabling said driven member to be driven through said high speed transmission train, one of said separate connections being a lost motion connection providing an action whereby the torque transmitted by said clutch-and-link device acting as a link in said low speed transmission train urges said clutch-and-link device out of engagement with said complementary clutch element, whereby falling torque tends to effect the change from the relatively low speed to the relatively high speed transmission train said last named connection being out of torque transmitting relationship with the high speed transmission train.

2. An automatic change speed gear, comprising a driving member, a driven member, a relatively low speed transmission train between said driving member and said driven member, a relatively high speed transmission train between said driving member and said driven member, first and second rotatable elements in said relatively low speed transmission train, a rotatable clutch-and-link device, connections connecting said clutch-and-link device to both of said first and second rotatable elements, whereby said clutch-and-link device forms a rotating link in said low speed transmission train for transmitting torque between said first and second rotatable elements, a complementary clutch element, said clutch-and-link device and said complementary clutch element forming the two elements of a clutch, and said clutch, when at the engaged state, completing said high speed transmission train, over-run means apertaining to the low speed transmission train enabling said driven member to be driven through said high speed transmission train, the connection connecting said clutch and link device to one of said rotatable elements being a lost motion connection, providing an action, whereby the load applied to said connection by the torque transmitted by said clutch-and-link device urges said clutch-and-link device out of engagement with said complementary clutch element, whereby falling torque tends to effect the change from the relatively low speed to the relatively high speed transmision train, said last named connection being out of torque transmitting relationship with the high speed transmission train.

3. An automatic change speed gear, comprising a driving member, a driven member, a relatively low speed transmission train between said driving member and said driven member, a relatively high speed transmission train between said driving member and said driven member, first and second rotatable elements in said relatively low speed transmission train, a rotatable clutch-and-link device, connections connecting said clutch-and-link device to both of said first and second rotatable elements, whereby said clutch- and-link device forms a rotating link in said low speed transmission train for transmitting torque between said first and second rotatable elements, a complementary clutch element, said clutch-and-link device and said complementary clutch element forming the two elements of a clutch, and said clutch, when at the engaged state, completing said high speed transmission train, over run means apertaining to the low speed transmission train enabling said driven member to be driven through said high speed transmission train, the connection connecting said clutch-and-link device to one of said rotatable elements being a lost motion connection providing an action whereby the load applied to said connection by the torque transmitted by said clutch and link device urges said clutch-and-link device out of engagement with said complementary clutch element, whereby falling torque tends to effect the change from the relatively low speed to the relatively high speed transmission train, and the connection connecting said clutch-and-link device to the other rotatable element being fast in respect of rotation while permitting radial movement of said clutch-and-link device into and out of engagement with said complementary clutch element, said last named connection forming a torque transmitting link in the high speed transmission train, and said lost motion connection being out of torque transmitting relationship with the high speed transmission train.

4. An automatic change speed gear, comprising a driving member, a driven member, a relatively low speed transmission train between said driving member and said driven member, a relatively high speed transmission train between said driving member and said driven member, two parallel plates rotatable about a common axis at right angles thereto, forming rotatable elements in said relatively low speed transmission train, a plurality of friction shoes of arcuate form arranged at intervals around said axis, connections connecting each of said friction shoes to both of said two parallel plates whereby said friction shoes form rotating links in said low speed transmission train for transmitting torque between said rotatable plates, a friction drum rotatable about said common axis and surrounding said friction shoes, said friction shoes and said drum forming the two elements of a clutch, and said clutch, when at the engaged state, completing said high speed transmission train, over-run means apertaining to the low speed transmission train enabling said driven member to be driven through said high speed transmission train, the connection connecting each friction shoe to one of said rotatable plates comprising pins engaging in slots so inclined that the load applied to said connection by the torque transmitted by said friction shoe urges said friction shoe out of engagement with said friction drum, whereby falling torque tends to effect the change from the relatively low speed to the relatively high speed transmission train, said last named connection being out of torque transmitting relationship with the high speed transmission train.

5. An automatic change speed gear as claimed in claim 4, wherein the connection connecting each friction shoe to the other of said rotatable plates is fast in respect of rotation while permitting radial movement of said friction shoe into and out of engagement with said friction drum.

6. An automatic change speed gear, comprising a driving member, a driven member, a relatively low speed transmission train between said driving member and said driven member, a relatively high speed transmission train between said driving member and said driven member, a clutch-and-link device separate connections connecting said clutch-and-link device between elements of said low speed transmission train, whereby said clutch-and-link device acts as a rotating link in said low speed transmission train, a complementary clutch element, said clutch-and-link device and said complementary clutch element forming the two elements of a clutch, and said clutch, when at the engaged state, completing said high speed transmission train, over-run means apertaining to the low speed transmission train enabling said driven member to be driven through said high speed transmission train, means biasing said clutch-and-link device into engagement with said complementary clutch element with a force which is greater or less according as the speed of rotation of said clutch-and-lank device is greater or less, one of said separate connections being a lost motion connection providing an action whereby the torque transmitted by said clutch-and-link device acting as a link in said low speed transmission train urges said clutch-and-link device out of engagement with said complementary clutch element, and means whereby the torque transmitted by said clutch causes said clutch to slip at a higher or lower torque value according as the force biasing said clutch-and-link device into engagement with said complementary clutch element is greater or less, whereby falling torque and rising speed tend to effect the change from the relatively low speed to the relatively high speer transmission train, and rising torque and falling speed tend to effect the change from the relatively high speed to the relatively low speed transmission train, said last named connection being out of torque transmitting relationship with the high speed transmission train.

7. An automatic change speed gear, comprising a driving member, a driven member, a relatively low speed transmission train between said driving member and said driven member, a relatively high speed transmission train between said driving member and said driven member, said relatively low speed transmission train comprising a rotatable clutch element driven by said driving member, internal gear teeth fast on said clutch element, a sun gear forming a reaction member, a planet gear in mesh both with said internal gear teeth and with said sun gear, a rotatable planet carrier carrying said planet gear, and a clutch-and-link device, said clutch-and-link device acting as a link connecting said planet carrier to said driven member, and said relatively high speed transmission train comprising a clutch constituted by said rotatable clutch element and said clutch-and-link device, said low speed transmission train comprising over-run means enabling said driven member to be driven through said high speed transmission train, and means whereby the torque transmitted by said clutch-and-link device acting as a link in said low speed transmission train urges said clutch-and-link device out of engagement with said clutch element, whereby falling torque tends to effect the change from the relatively low speed to the relatively high speed transmission train.

8. An automatic change speed gear, comprising a driving member, a driven member, a relatively low speed transmission train between said driving member and said driven member, a relatively high speed transmission train between said driving member and said driven member, said relatively low speed transmission train comprising a rotatable clutch element driven by said driving member, internal gear teeth fast on said clutch element, a sun gear forming a reaction member, a planet gear in mesh both with said internal gear teeth and with said sun gear, a rotatable planet carrier carrying said planet gear, and a clutch-and-link device, said clutch-and-link device acting as a link connecting said planet carrier to said driven member, and said relatively high speed transmission train comprising a clutch constituted by said rotatable clutch element and said clutch-and-link device, one-way brake means permitting said sun gear to rotate in one direction but not in the other, whereby said sun gear is capable of forming a reaction member for said low speed transmission train, and is capable of rotating to permit said driven member to be driven through said high speed transmission train, and means whereby the torque transmitted by said clutch-and-link device acting as a link in said low speed transmission train urges said clutch-and-link device out of engagement with said clutch element, whereby falling torque tends to effect the change from the relatively low speed to the relatively high speed transmission train.

9. An automatic change speed gear, comprising a driving member, a driven member, a relatively low speed transmission train between said driving member and said driven member, a relatively high speed transmission train between said driving member and said driven member, said relatively low speed transmission train comprising a rotatable clutch element driven by said driving member, internal gear teeth fast on said clutch element, a sun gear forming a reaction member, a planet gear in mesh both with said internal gear teeth and with said sun gear, a rotatable planet carrier carrying said planet gear, and a clutch-and-link device, said clutch-and-link device acting as a link connecting said planet carrier to said driven member, and said relatively high speed transmission train comprising a clutch constituted by said rotatable clutch element and said clutch-and-link device, one-way clutch means connected in the low speed transmission train between said planet carrier and said clutch-and-link device, so as both to complete said low speed transmission train and to permit said driven member to be driven through said high speed transmission train, and means whereby the torque transmitted by said clutch-and-link device acting as a link in said low speed transmission train urges said clutch-and-link device out of engagement with said clutch element, whereby falling torque tends to effect the change from relatively low speed to the relatively high speed transmission train.

10. An automatic change speed gear comprising a driving member, a driven member, a relatively low speed transmission train between said driving member and said driven member, a relatively high speed transmission train between said driving member and said driven member, said relatively low speed transmission train comprising a rotatable planet carrier driven by said driving member, and a clutch-and-link device acting as a link connecting said planet carrier to said driven member, and said relatively high speed transmission train comprising said rotatable planet carrier, a sun gear forming a reaction member, a rotatable clutch element, internal teeth fast on said clutch element, a planet gear mounted on said planet carrier in mesh with both said sun gear and said internal teeth, and a clutch constituted by said rotatable clutch element and said clutch-and-link device, one-way clutch means connected in the low speed transmission train between said planet carrier and said clutch-and-link device, so as both to complete said low speed transmission train and to permit said driven member to be driven through said high speed transmission train, and means whereby the torque transmitted by said clutch-and-link device acting as a link in said low speed transmission train urges said clutch-and-link device out of engagement with said clutch element, whereby falling torque tends to effect the change from the relatively low speed to the relatively high speed transmission train.

11. An automatic change speed gear comprising a driving member, a driven member, a relatively low speed transmission train between said driving member and said driven member, a relatively high speed transmission train between said driving member and said driven member, said relatively low speed transmission train comprising a clutch-and-link device acting as a link connecting said driving member to said driven member, and said relatively high speed transmission train comprising a rotatable clutch element, gearing between said driving member and said rotatable clutch element, whereby said roatable clutch element is rotated at higher speed than said driving member, and a clutch constituted by said rotatable clutch element and said clutch-and-link device, one way clutch-means connected in the low speed transmission train between said driving member and said clutch-andlink device so as both to complete said low speed transmission train and to permit said driven member to be driven through said speed transmission train, and means whereby the torque transmitted by said clutch-and-link device acting as a link in said low sped transmission train urges said clutch-and-link device out of engagement with said clutch element, whereby falling torque tends to effect the change from the relatively low speed to the relatively high speed transmission train.

12. An automatic change speed gear according to claim 8, and comprising an additional relatively low speed transmission train between said driven member and a further driven member, an additional relatively high speed transmission train between said driven member and said further driven member, said additional relatively low speed transmission train comprising internal gear teeth fast on said driven member, a second sun gear forming a reaction member, a second planet gear in mesh both with said last named internal gear teeth and with said second sun gear, a second rotatable planet carrier carrying said second planet gear, and a second clutch-and-link device acting as a link connecting said second planet carrier to said further driven member, and said additional relatively high speed transmission train comprising a second clutch constituted by said rotatable clutch element and said second clutch-and-link device, second one way brake means permitting said second sun gear to rotate in one direction but not in the other, whereby said second sun gear is capable of forming a reaction member for said additional low speed transmission train and is capable of rotating to permit said further driven member to be driven through said additional high speed transmission train, and means whereby the torque transmitted by said second clutch-an-link device acting as a link in said additional low speed transmission train urges said second clutch-and-link device out of engagement with said clutch element whereby falling torque tends to effect the change from the additional relatively low speed transmission train to the additional relatively high speed transmission train.

13. An automatic change speed gear comprising, in combination, a driving member, a driven member, a relatively low speed transmission train arranged between said driving member and said driven member, a relatively high speed transmission train arranged between said driving member and said driven member, a clutch-and-link device between elements of said low speed transmission train whereby said clutch-and-link device acts as a rotating link in said low speed transmission train, a complementary clutch element, said clutch-and-link device and said complementary clutch element forming a two element clutch in said high speed transmission train, and said complementary clutch element being transmissively connected to said driving element, whereby engagement of said two element clutch is operative to complete said high speed transmission train from said driving element through said complementary clutch element, said clutch-and-link device, and one of said separate connections remote from said driving element to said driven element, over-run means associated with the low speed transmission train located between said driving element and the other of said separate connections disposed nearest to said driving element enabling said high speed transmission train to function, said other connection being a lost motion connection providing an action whereby the torque transmitted by said clutch-and-link device acting as a link in said low speed transmission train urges said clutch-and-link device out of engagement with said complementary clutch element, whereby falling torque tends to effect the change from the low speed to the high speed transmission train.

References Cited in the file of this patent

UNITED STATES PATENTS

| | | |
|---|---|---|
| 1,311,236 | Kittredge | July 29, 1919 |
| 1,843,194 | Banker | Feb. 2, 1932 |
| 1,990,039 | Lansing | Feb. 5, 1935 |
| 2,144,788 | Barnes | Jan. 24, 1939 |
| 2,673,633 | Miller et al. | Mar. 30, 1954 |